(12) United States Patent
Frank et al.

(10) Patent No.: US 8,178,618 B2
(45) Date of Patent: May 15, 2012

(54) PROCESS FOR PRODUCTION OF A MODIFIED ACETALATED POLYVINYL ALCOHOL

(75) Inventors: Michael Frank, Mainz (DE); Sven Köhnen, Niedernhausen (DE); Matthias Gutweiler, Hünfelden (DE); Kaoru Ikeda, Okayama (JP)

(73) Assignees: Kuraray Europe GmbH, Frankfurt (DE); Kuraray Co. Ltd., Okayama (JP)

( * ) Notice: Subject to any disclaimer, the term of this patent is extended or adjusted under 35 U.S.C. 154(b) by 802 days.

(21) Appl. No.: 12/158,101

(22) PCT Filed: Dec. 21, 2006

(86) PCT No.: PCT/EP2006/070106
§ 371 (c)(1),
(2), (4) Date: Nov. 21, 2008

(87) PCT Pub. No.: WO2007/071770
PCT Pub. Date: Jun. 28, 2007

(65) Prior Publication Data
US 2009/0176937 A1    Jul. 9, 2009

(30) Foreign Application Priority Data
Dec. 21, 2005 (EP) ...................................... 05112546

(51) Int. Cl.
*C08F 8/00* (2006.01)
(52) U.S. Cl. ............................................. 525/61; 525/58
(58) Field of Classification Search .................... 525/58, 525/61
See application file for complete search history.

(56) References Cited

U.S. PATENT DOCUMENTS

| 5,580,938 A | * | 12/1996 | Gutweiler et al. | ............ 525/455 |
| 6,121,349 A | * | 9/2000 | Fischer et al. | ................ 523/412 |
| 2004/0096683 A1 | | 5/2004 | Ikeda et al. | |

FOREIGN PATENT DOCUMENTS

| DE | 42 01 941 A1 | 8/1993 |
| EP | 1 403 289 A1 | 3/2004 |
| JP | 2001-220426 A | 8/2001 |

* cited by examiner

*Primary Examiner* — David W Wu
*Assistant Examiner* — Marie Reddick
(74) *Attorney, Agent, or Firm* — Millen, White, Zelano & Branigan, P.C.

(57) ABSTRACT

The invention relates to a method for modifying acetalated polyvinyl alcohols comprising reacting a melt acetalated polyvinyl alcohols with epoxides. The invention also relates to uses of the resultant modifying acetalated polyvinyl alcohols, including uses in ceramic applications.

16 Claims, 3 Drawing Sheets

PROCESS FOR PRODUCTION OF A MODIFIED ACETALATED POLYVINYL ALCOHOL

This application is a 35 USC 371 U.S. national stage filing of PCT/EP2006/070106 filed Dec. 21, 2006, which in turn claims the priority under 35 U.S.C. 119 to European Patent Application 05112546.6, filed Dec. 21, 2005.

DESCRIPTION

The invention relates to a process for the modification of acetalated polyvinyl alcohols by reaction with epoxides.

STATE OF THE ART

Acetalated polyvinyl alcohols such as e.g. polyvinyl butyral (PVB) exhibit increasing solution viscosities and/or melt viscosities with an increasing molecular weight. For applications as binders, e.g. in printing inks or coatings, it would, however, be desirable to use high molecular acetalated polyvinyl alcohols with a low solution viscosity and/or melt viscosity. An appropriate measure in this respect is to modify the residual hydroxy functions of the polymer with side chains in such a way that the effect of the hydrogen bridge bonds and/or interactions in general between the hydroxy functions are minimised or reduced.

EP 1 403 289 A1 describes such a process for reacting ethylene vinyl alcohol copolymers with glycide esters in an extrusion process. As a result of this reaction, the epoxides are added on to the hydroxy functions to give a corresponding side chain. These polymers contain between 5 and 55% by mole ethylene units, the remaining repeating units being vinyl acetate groups and vinyl alcohol groups. The vinyl alcohol groups are not acetalated as a result of which a large number of free hydroxy functions are present with a degree of hydrolysis of these polymers of more than 90%. Thus, high levels of conversion and/or degrees of substitution can be achieved relatively easily with these epoxides by way of the reaction.

The use of acetalated polyvinyl alcohols without ethylene units, i.e. of compounds with a considerably lower number of free hydroxy functions, has not been mentioned in this publication.

DE 42 019 41 A1 discloses the production of a paint system by reacting polyvinyl butyral with glycide ethers as epoxide in organic solvents. A similar process is disclosed in JP 2001-210426 for reacting polyvinyl acetals with aromatic epoxides. In this case, too, the reaction is carried out in organic solvents.

The use of solvents for the modification of polymers is frequently not desirable since, firstly, the starting materials needs to be dissolved in a complicated manner using energy and, above all, time. Following the reaction, the solvent needs to be removed using energy and time and again requiring major effort. If solvent residues remain in the end product such polymers cannot be used e.g. for packaging of foods. Moreover, the reaction temperatures are usually restricted to the boiling temperature of the solvent.

In chemical reactions with polyvinyl acetals such as polyvinyl butyral, decomposition reactions by splitting of acetals need to be generally feared. These are catalysed by acids and occur in an increased level at elevated temperatures.

OBJECT

The object of the present invention consequently consisted of providing a process for the production of modified, acetalated polyvinyl alcohols which does not exhibit the above-mentioned disadvantages of the state of the art.

PRESENTATION OF THE INVENTION

Surprisingly enough, it has been found that polyvinyl acetals can be reacted in the melt, i.e. at elevated temperatures, with epoxides.

The subject matter of the present invention consequently consists of a process for the production of modified, acetalated polyvinyl alcohols by reacting a melt of the acetalated polyvinyl alcohol with at least one epoxide with the general formula I

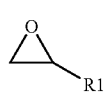

with
$R_1$=H, aliphatic, cycloaliphatic aromatic or aliphatic-aromatic radical with 1 to 20 carbon atoms or $CH_2O(CO)CCH_2R_2$ and $R_2$=H, aliphatic radical with 1 to 10 carbon atoms.

In the following, modification of acetalated polyvinyl alcohols should be understood to mean the formal addition of epoxides to their hydroxy functions.

In order to obtain modified, acetalated polyvinyl alcohols that can be chemically crosslinked by radiation, epoxides according to the general formula II

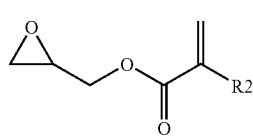

can be used, $R_2$ representing H, an aliphatic radical with 1 to 10 carbon atoms, in particular $R_2$=—$CH_3$ or —$C_2H_5$.

In this way, substituted, acetalated polyvinyl alcohols are obtained which possess a reactive double bond in the newly inserted side chain. These double bonds may be thermally or chemically crosslinked by radiation, preferably using UV radiation.

Preferably, use is made, as acetalated polyvinyl alcohol, of one with at least one aliphatic aldehyde with 1 to 10 carbon atoms, in particular butyraldehyde. These compounds may additionally contain vinyl acetate groups, i.e. those present in the fully or partially saponified form. The acetalation with one or several aldehydes takes place in a manner acid catalyzed in solution as known to the expert, preferably in an aqueous medium using acid catalysis. The polyvinyl acetals thus obtained still containing vinyl alcohol groups are reacted according to the invention with at least one epoxide, at least part of the vinyl alcohol groups being reacted. Polyvinyl butyral, in particular, is used as acetalated polyvinyl alcohol.

The acetalated polyvinyl alcohols used in the process according to the invention preferably exhibit a degree of acetylation of 40 to 90% by weight, preferably 65 to 88% by weight. Apart from the acetal groups, these polymers may possess a proportion of 0.01-30% by weight, preferably 0.01-20% by weight, particularly preferably 0.5-8% by weight and in particular 1-6% by weight of residual acetate groups and a corresponding proportion of free alcohol functions.

The residual polyvinyl alcohol content of the acetalated polyvinyl alcohols used according to the invention is preferably between 10 and 30% by weight, in particular between 14 and 18% by weight or alternatively between 19 and 27% by weight. Such polymers are available from Kuraray Specialities Europe GmbH by the commercial name of MOWITAL®.

Preferably, the acetalated polyvinyl alcohols are used in the form of granules, in particular granules produced by extrusion, e.g. in accordance with WO 2005/019312 A1. Granulated products advantageously exhibit a low level of moisture and higher solids contents per volume and/or a higher bulk density.

The process according to the invention is preferably carried out continuously in the melt of the acetalated polyvinyl alcohol. This permits an economic production of the modified polyvinyl acetals. Melt temperatures of 150 to 270° C., in particular 170 to 250° C., or 190 to 250° C. have proved suitable. Preferably, the reaction is carried out in a tubular reactor, stirred vessel or extruder. The reaction times may be between 30 seconds and 5 minutes, in particular between 30 seconds and 2 minutes in the case of the process according to the invention.

Moreover, it is possible to carry out the reaction in the presence of 1 to 100% by weight, preferably 1 to 30% by weight of plasticisers (based on the polymer). In these cases, the melt of a mixture of the acetalated polymers and plasticisers is used for the reaction with the epoxides.

A list of commercial plasticisers containing details of their compatibility with polyvinyl acetals, in particular polyvinyl butyral, can be found e.g. in the printed document Modern Plastics Encyclopaedia 1981/1982, page 710 to 719. Preferred plasticisers are diesters of aliphatic diols, in particular of aliphatic polyether diols and/or polyether polyols with aliphatic carboxylic acids, preferably diesters of polyalkylene oxides, in particular diesters of diethylene glycol, triethylene glycol and tetraethylene glycol with aliphatic (C6-C10) carboxylic acids, preferably 2-ethyl butyric acid and n-heptanoic acid, also diesters of aliphatic or aromatic (C2-C18) dicarboxylic acids, preferably adipine, sebacine and phthalic acid, with aliphatic (C4-C12) alcohols, preferably dihexyl adipate, phthalates, trimellitates, phosphates, fatty acid esters, in particular triethylene glycol-bis-(2-ethyl butyrate), triethylene glycol ethyl hexanoate (3G8), aromatic carboxylic acid esters, in particular dibenzoates and/or hydroxycarboxylic acid esters.

The process according to the invention is preferably carried out in the presence of and/or with the catalysis of metal salts, e.g. Zn salts, Fe salts and/or Sn salts. The addition of the catalytic system $Zn(acac)_2/CF_3SO_3H/DME$ according to EP 1 403 289 A1 has proved to be particularly suitable.

As an alternative, the reaction can also be carried out in the presence of bases, in particular of sterically hindered nitrogen bases such as e.g. bases with the general formulae III to V

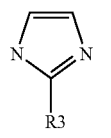

III

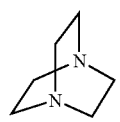

IV

-continued

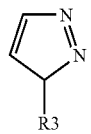

V ($R_3$=H, $CH_3$ or $C_2H_5$).

The conversion preferably takes place in the absence of an organic solvent or water. Small quantities of solvent such as they are required e.g. on addition of the catalyst, have no negative effect and are not considered to be solvents up to an addition of 5% by weight, based on the quantity of the polymer. The presence of small quantities of additives such as e.g. UV stabilisers or antioxidants with a total quantity of between 1 and 25, preferably 5 to 15% by weight, based on the quantity of the polymer, is not critical.

By means of the process according to the invention, it is possible to substitute all or at least part of the residual alcohol groups of the acetalated polyvinyl alcohol.

Preferably, 25 to 95%, in particular 30 to 75% or 5 to 25% of the residual alcohol groups originally present in the acetalated polyvinyl alcohol are substituted.

By way of the process according to the invention, the viscosity of the non-modified starting products is reduced while the molecular weight is hardly altered, since the reaction preferably takes place without crosslinking of polymer chains. The reaction is preferably carried out until a reduction in the viscosity of the polymers produced according to the invention of at least 10%, preferably of at least 20%, in particular of at least 30%, based on the acetalated polyvinyl alcohol used, is obtained. The determination of the viscosity takes place according to DIN 53015 at 20° C. (10% by weight in ethanol:water 95:5% by weight) using a viscosimeter according to Höppler.

As a result of their reduced viscosity in comparison with the non-modified starting products, the polymers produced according to the invention can be used as component of coating materials such as powder coatings or liquid coatings, for the manufacture of ceramics, ceramic films or for the manufacture of green films in ceramics applications, e.g. by the tape cast process.

The polymers produced according to the invention moreover exhibit an improved dispersion behaviour and may consequently be used in printing inks, screen printing pastes or metal pigment pastes. The use in adhesives, in particular for bonding metal parts e.g. in motor vehicle construction, is also possible.

Figure 1:
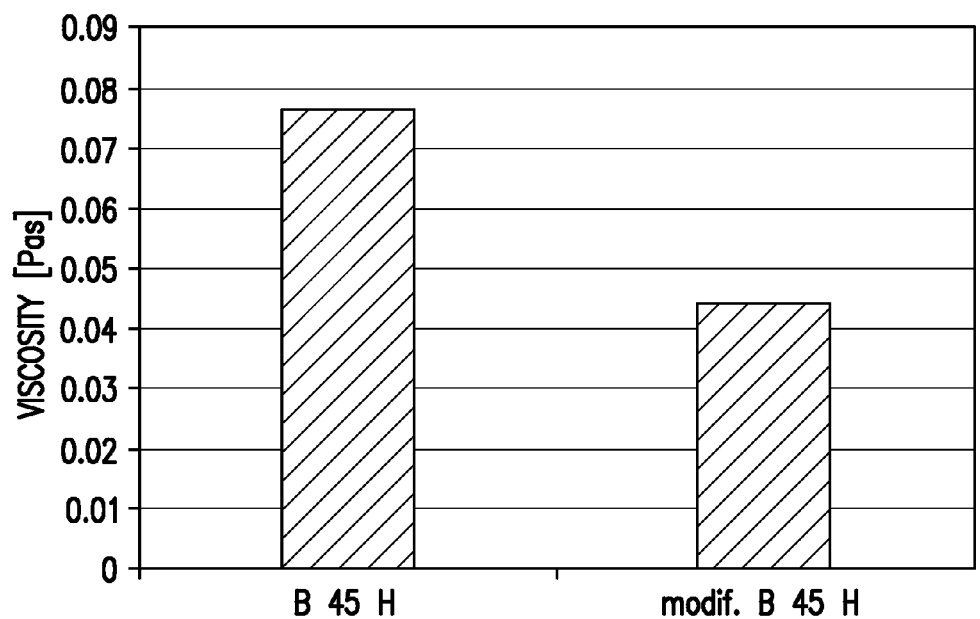
FIG. 1 graphically illustrates the mean viscosity of the binder solutions of Comparative Example 4 and Example 9 concerned with a shear stress of 20 Pa*s.

EXAMPLES a) Determination of the Proportion of Acetate Groups (Polyvinyl Acetate Content)

The PV acetate content should be understood to mean the proportion, in percent, of acetyl groups which is obtained from the consumption of the quantity necessary for the saponification of 1 g of substance.

Method of Determination (Based on EN ISO 3681):

Approximately 2 g of the substance to be examined are weighed with an accuracy of 1 mg into a 500 ml round bottomed flask and dissolved in 90 ml of ethanol and 10 ml of benzyl alcohol under a reflux condenser. After cooling, the solution is rendered neutral with 0.01 N NaOH against phenolphthalein. Subsequently, 25.0 ml of 0.1 N KOH are added and heated under a reflux condenser for 1.5 hours. The flask is allowed to cool in the closed state and the excess liquor is titrated with 0.1 N hydrochloric acid against phenolphthalein as indicator until permanent decolourisation occurs. A blank specimen is treated in the same way. The PV acetate content is calculated as follows: PV acetate content (%)=(b−a)*86/E, a representing the consumption of 0.1 N KOH for the specimen in ml, b representing the consumption of 0.1 N KOH for a blank test in ml and E representing the amount of the substance to be investigated weighed in, in the dried state, in g.

b) Determination of the Proportion of Vinyl Alcohol Groups (Polyvinyl Alcohol Content) in Non-Modified Polyvinyl Acetal The polyvinyl alcohol content is the proportion, in percent, of hydroxyl groups which is detectable by the subsequent acetylation with acetic anhydride.

Method of Determination (Based on DIN 53240)

Approximately 1 g of MOWITAL® is weighed with an accuracy of 1 mg into a 300 ml Erlenmeyer ground flask, 10.0 ml of acetic anhydride pyridine mixture (23:77 v/v) are added and heated to 50° C. for 15-20 hours. After cooling, 17 ml of dichloroethane are added and the flask is briefly rotated. Subsequently, 8 ml of water are added with stirring, the flask is closed with a stopper and stirring carried out for 10 minutes. The neck of the flask and the stopper are rinsed with 50 ml of demineralised water, a layer of 5 ml n-butanol is introduced and the free acetic acid is titrated with 1 N caustic soda solution against phenolphthalein. A blank specimen is treated in the same way. The polyvinyl alcohol content is calculated as follows: polyvinyl alcohol content (%)=(b−a)*440/E, a representing the consumption of 1 N NaOH for the specimen in ml, b representing the consumption of 1 N NaOH for the blank specimen in ml and E representing the amount of the substance to be examined weighed in, in the dried state, in g.

To determine the proportion of vinyl alcohol groups of the polyvinyl acetal reacted with the epoxide, the proportion of acetate groups is determined using method a) before and after the reaction. As a result of the reaction, the proportion of acetate groups increases by the number of hydroxy groups reacted with the epoxide. The number of hydroxy groups originally present is determined on the original material in line with method b). The difference between these values corresponds to the proportion of vinyl alcohol groups in the polyvinyl acetal reacted with the epoxide.

A double screw extruder with the following configuration and parameters was used for the examples given below:

$L/D=72$

Number of heating zones: 18
Rate of throughput: 20 kg/h
Temperature: 200° C.

Metering in of the polyvinyl acetal (MOWITAL® from KSE) is carried out in the feed zone, metering in of the catalyst and/or the reagent system in the heating zone 4. The catalyst (Zn(acac)TfO) is previously produced in situ by the equimolar conversion of 0.1M solution of zinc acetyl acetonate (Zn(acac)$_2$) in DME (dimethoxyethane) using 0.1M solution of trifluoromethane sulphonic acid (TfOH) (in DME). Further details regarding this catalyst system can be found in EP 1 403 289 A1.

The evaluation of the reaction (degree of modification) is carried out using NMR spectroscopy and quantitative evaluation of the signal of the methyl group of the hydroxypropyl radical in relation to that of the acetal radical.

The following table shows the results obtained. It is shown that the acetalated polyvinyl alcohols according to the invention exhibit a considerably reduced viscosity in comparison with the starting polymers.

MOWITAL® type used/residual alcohol content, % by weight

| No. | MOWITAL® type used/residual alcohol content, % by weight | Metering of epoxypropane based on the polymer g mmole/kg | | Metering of the catalyst based on the epoxide μmole/g | | Fate of rotation of the screw, hl rpm | Number of reacted vinyl hydroxyl-propyl groups mmole/kg | Degree of conversion % | % by weight | No. of vinyl alcohol groups % by weight | Viscosity η(mPas) | Viscosity modification Δη (%) |
|---|---|---|---|---|---|---|---|---|---|---|---|---|
| | | | Kg/h | | Kg/h | | | | | | | |
| V1 | B 30 HH 11-14% by weight | — | — | — | — | — | — | — | — | 2.70 | 41.0 | — |
| 1 | B 30 HH 11-14% by weight | 2.5 | 2.90 | 2 | 0.4 | 400 | 0.7 | 28.0 | 3.17 | 9.53 | 28.2 | 31.2 |
| 2 | B 30 HH 11-14% by weight | 2.5 | 2.90 | 2.5 | 0.5 | 400 | 1.05 | 42.0 | 4.74 | 7.96 | 27.2 | 33.7 |
| 3 | B 30 HH 11-14% by weight | 2.5 | 2.90 | 3 | 0.6 | 400 | 1.17 | 46.8 | 5.27 | 7.43 | 27.0 | 34.1 |
| 4 | B 30 HH 11-14% by | 2.5 | 2.90 | 3 | 0.6 | 500 | 1.17 | 46.8 | 5.27 | 7.43 | 26.4 | 35.6 |

-continued

| No. | MOWITAL ® type used/residual alcohol content, % by weight | Metering of epoxypropane based on the polymer g mmole/kg | Kg/h | Metering of the catalyst based on the epoxide μmole/g | Kg/h | Fate of rotation of the screw, hl rpm | Number of reacted vinyl hydroxyl-propyl groups mmole/kg | Degree of conversion % | % by weight | No. of vinyl alcohol groups % by weight | Viscosity η(mPas) | Viscosity modification Δη (%) |
|---|---|---|---|---|---|---|---|---|---|---|---|---|
| V2 | B 45 H 18-21% by weight | 2.5 | 2.90 | — | — | — | — | — | — | 18.80 | 68.6 | — |
| 5 | B 45 H 18-21% by weight | 2.5 | 2.90 | 2 | 0.4 | 300 | 0.87 | 34.8 | 4.81 | 13.99 | 43.2 | 37.0 |
| 6 | B 45 H 18-21% by weight | 2.5 | 2.90 | 3 | 0.6 | 300 | 1.04 | 41.6 | 5.54 | 13.26 | 41.5 | 39.5 |
| V3 | B 60 T 24-27% by weight | 2.5 | — | — | — | — | — | — | — | 25.5 | 191.9 | — |
| 7 | B 60 T 24-27% by weight | 2.5 | 2.18 | 5 | 0.75 | 200 | 1.20 | 27.3 | 6.96 | 18.54 | 102.2 | 46.7 |
| 8 | B 60 T 24-27% by weight | 2.5 | 2.18 | 5 | 0.75 | 200 | 1.21 | 27.5 | 7.02 | 18.45 | 103.6 | 46.0 |

Examples of the Use of Polymers Produced According to the Invention in Ceramics Applications Comparative Example 4

Binder used: MOWITAL® B45 H (Kuraray Specialities Europe GmbH)=V2

Example 9

Binder used: B 45 H modified with epoxypropane in line with example 6
Other materials used

| Component | Description |
|---|---|
| Solvent | Azeotropic toluene ethanol mixture |
| Dispersing agent | Menhadren fish oil, Reichhold Inc., USA |
| Ceramic filler | Alumina A16-SG, Alcoa, USA Grain size $d_{50}$: 0.35 μm Specific surface area (BETR): 6.6 $m^2g$ |
| Plasticiser | Alkyl (C7-C9) benzyl phthalate, Ferro |

Production

The production of the casting slip takes place in a manner known to the expert
Solvent plus dispersing agent (fish oil) weighed in
Addition of powder (deagglomeration)
Addition of the binder plus plasticiser (homogenising, degassing)

Evaluation of the Properties of the Suspension a) Rheological Behaviour of Binder Solutions Method of measurement: For the determination of the rheological properties, solutions of 10% by mass of the polymers concerned were produced in the azeotropic solvent mixture of ethanol/toluene and homogenised in a tumble mixer for 24 h.

The rheological characterisation was carried out according to the cone plate principle of measurement (cone diameter 50 mm, angle of aperture 2°) using the rotation rheometer UDS 200 from Anton Paar (Austria). The control of the rotating cone was effected by shear stress, the measuring temperature was 20° C. The viscosity was plotted against the shear stress.

Results and assessment: FIG. 1 shows the mean viscosity of the binder solution concerned with a shear stress of 20 Pa*s, the binder solutions exhibiting a constant viscosity over the entire measuring range (Newtonian behavior). The solution with B 45 H (comparative example 4) exhibited a viscosity within the range of 0.07 to 0.08 Pa*s. The solution of the PVB modified according to the invention in line with example 9 exhibits a solution viscosity of 0.045 Pa*s and is consequently considerably below the value of the solution with MOWITAL® B 45H.

b) Rheologie of PVB $Al_2O_3$ Suspensions

Method of measurement: In order to assess the dispersing effect of the binder, different $Al_2O_3$ suspensions (40% by weight of azeotropic mixture of ethanol/toluene, 60% by weight $Al_2O_3$) was prepared. The binder and/or dispersing agent concerned were added stepwise thereto and homogenised for several hours. During the preparation of the films, the dispersing agent (in this case PVB) was pre-dissolved in the solvent and the powder was then added. The suspension concerned was characterised by means of the rotary viscosimeter. The suspension viscosity at a shear rate of 100 l/s was used as reference value.

Figure 2:
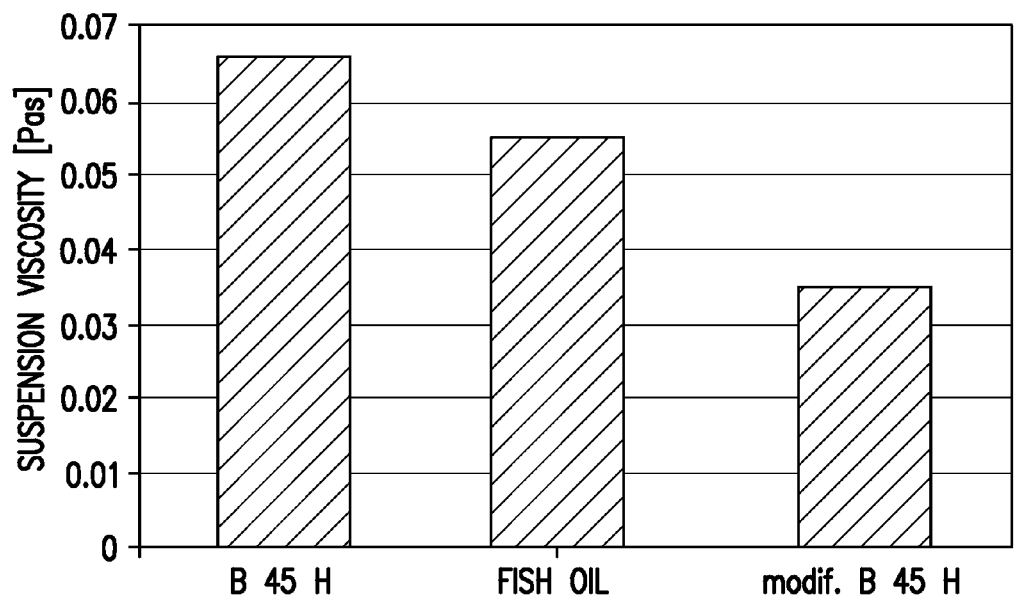
FIG. 2 shows viscosities of different suspensions as a function of solids content of the suspension.

Results and evaluation: FIG. 2 shows the viscosities of different suspensions as a function of the solids content of the suspension.

Suspensions with the PVB binders produced according to the invention have a reduced viscosity in comparison with fish oil which is frequently used as dispersing agent. Moreover, an improved dispersing effect is obtained in the case of the polymers produced according to the invention, in comparison with Mowital® B 45 H, since the viscosity values of suspensions produced correspondingly are lower than those of the suspensions produced with Mowital® B 45 H.

Figure 3:
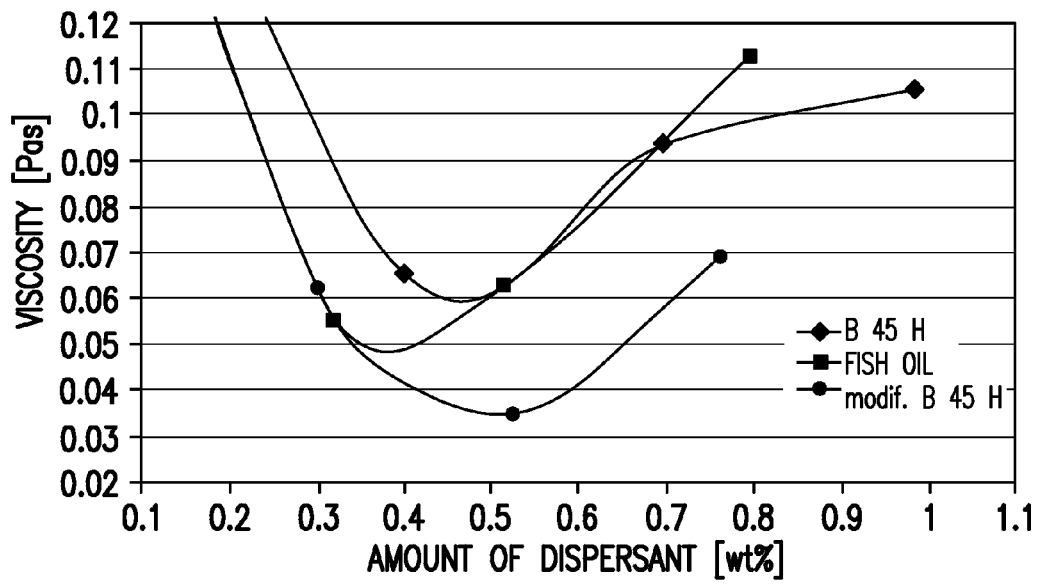
FIG. 3 graphically illustrates viscosities of different suspensions as a function of amount of dispersant.

A comparison of the dispersing properties of the dispersing agents investigated is shown in FIG. 3. The viscosity of the $Al_2O_3$ suspension concerned is all the lower the stronger the dispersion effect. A clearly highly liquid and consequently better dispersed suspension is achieved when using the PVB type modified with epoxy propane according to the invention, instead of B 45 H or fish oil.

Production of Green Films

The suspensions (casting slips) produced as described above were degasified and cast according to the doctor blade process with a film casting facility 4 m long with stationery double chamber casting device. A siliconised PET film (thickness 100 µm) was used as casting substrate. After casting, the film was dried in the air for 48 h (temperature=22° C.; atmospheric humidity=65%) and subsequently pulled off.

The films obtained had a thickness of 200 µm and exhibited no cracks, blisters or flaws on optical assessment. The density of the cast $Al_2O_3$ films was determined by the hydrometer method according to Archimedes. The green film densities were all within the range of between 60 and 70 percent of the theoretical density common for film casting.

Suitable tensile specimens in the form of so-called "dog bones" were punched out of the green films concerned. 10 tensile specimens were punched transversely and 10 specimens parallel to the casting direction per film type in order to be able to determine a possible anisotropic behaviour of the green body. A fibre tensile testing machine (Fafegraph ME, Textechno) was used as test machine. The maximum range of measurement was 100 N, the stress rate 10 mm/min. The measurements were carried out at room temperature in ambient air.

Figure 4:
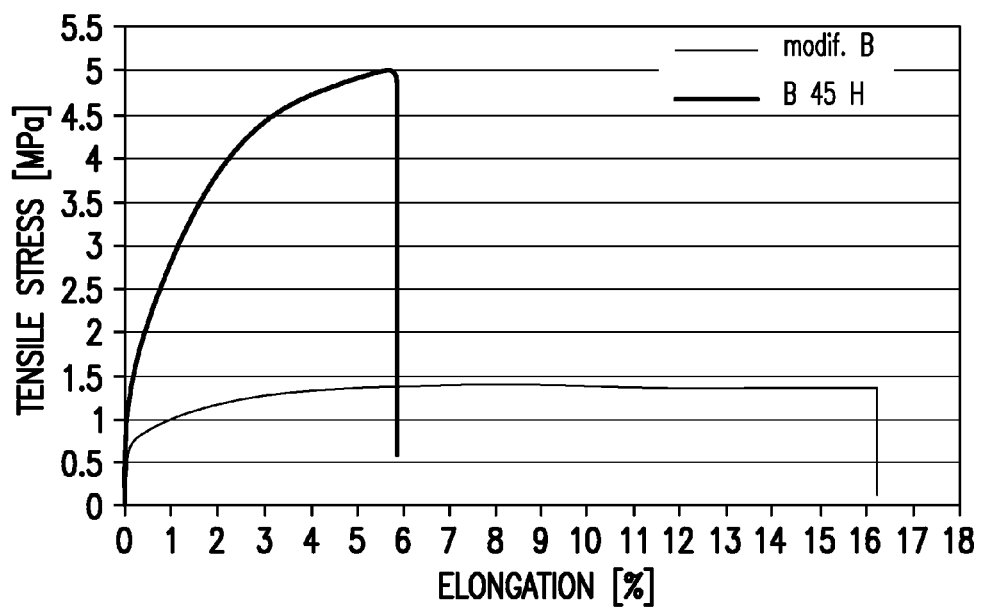
FIG. 4 shows the tensile strength of green film specimens measured as imposed tensile stress as a function of elongation.

The green films with B45H (comparative example 2) as binder exhibit a development typical of green films according to the state of the art, the test specimens breaking with a stress of 4.98±0.04 MPa and an elongation of 5.9±0.71 percent (compare FIG. 4). Films with polyvinyl alcohols modified according to the invention in line with example 9 as binders, on the other hand, exhibit a clearly lower tensile strength of 1.4±0.2 MPa. A tensile stress of 1.5 MPa is not reached throughout the entire measurement. Following an elongation of 16.25±0.65%, the specimen finally breaks. The products produced according to the invention exhibit a clearly plastic portion in comparison with films according to the state of the art.

The investigations have shown that polyvinyl alcohols modified according to the invention have clearly plasticising properties when used as binder. Based on this characteristic property, it would be conceivable to reduce the proportion of plasticiser admixed to the casting slip or to omit it altogether and to achieve in this way similar mechanical properties to films according to the state of the art in which the proportion of organic additives would then be reduced.

Figure 5:
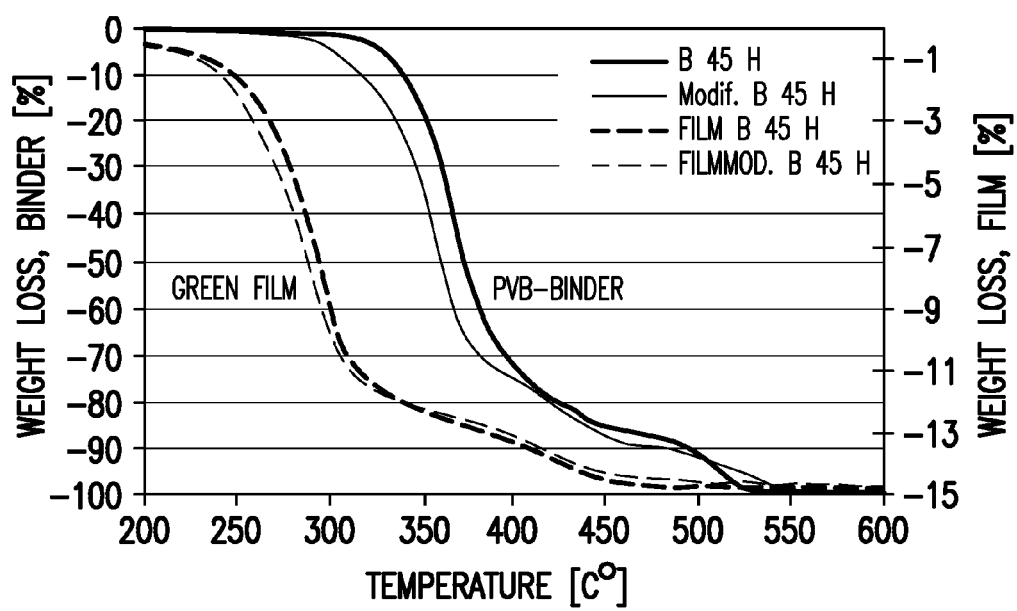
FIG. 5 graphically illustrates the burning out behavior of the binder solutions of Comparative Example 4 and Example 9, and green films formed therefrom.

In FIG. 5, the burning out behaviour of the binder from comparative example 4 and example 9 and the green films produced therewith is shown. The loss of mass of the binder concerned was determined as a function of the temperature in the air using thermoanalysis (Type: STA 409, Netzsch). The heating rate used was 5 k/min. In this case, it can be seen that the binder according to the invention and/or the green films produced therewith exhibit a clearly more homogeneous burning out of the binder in comparison with binders according to the state of the art.

The modified acetalated polyvinyl alcohols produced according to the invention are thus suitable for the production of ceramic green films. In an advantageous manner, an improved dispersion effect and an increased proportion of solids is achieved during the production of the suspension using modified acetalated polyvinyl alcohols produced according to the invention and consequently considerable application engineering advantages are achieved.

The invention claimed is:

1. A process for production of a modified, acetalated polyvinyl alcohol, said process comprising:
   reacting a melt of an acetalated polyvinyl alcohol with at least one epoxide of formula I

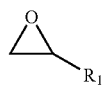

wherein
   $R_1$ is H, an aliphatic, cycloaliphatic aromatic or aliphatic-aromatic radical with 1 to 20 carbon atoms, or $CH_2O(CO)CCH_2R_2$; and
   $R_2$ is H, or an aliphatic radical with 1 to 10 carbon atoms,
wherein the reaction is carried out in the presence of Zn, Fe and/or Sn salts.

2. A process according to claim 1, wherein said at least one epoxide is a compound of formula II,

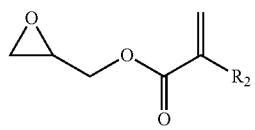

wherein $R_2$ is H or an aliphatic radical with 1 to 10 carbon atoms.

3. A process according to claim 1, wherein the acetalated polyvinyl alcohol has a residual polyvinyl alcohol content of 10 to 30% by weight.

4. A process according to claim 1, wherein the reaction is carried out in the absence of an organic solvent or water.

5. A process according to claim 1, wherein the reaction is carried out in the presence of a Zn salt.

6. A process according to claim 5, wherein the process said Zn salt is $Zn(acetyl\ acetonate)_2/CF_3SO_3H$/dimethoxyethane or Zn(acetyl acetonate)trifluoromethane sulphonate.

7. A process according to claim 1, wherein the reaction is carried out in the presence of bases.

8. A process according to claim 1, wherein the reaction is carried out at a melt temperature of 150 to 270° C.

9. A process according to claim 1, wherein the reaction is carried out until there is a reduction in the viscosity of at least 10%, based on the acetalated polyvinyl alcohol.

10. A process according to claim 1, wherein 25 to 95% of the hydroxy groups of the acetalated polyvinyl alcohol are reacted with the epoxide.

11. A process according to claim 1, wherein the reaction is carried out in the presence of 1 to 100% by weight of plasticizers, based on the acetalated polyvinyl alcohol.

12. A process according to claim 1, wherein $R_1$ is $CH_2O(CO)CCH_2R_2$, and $R_2$ is $CH_3$ or $-C_2H_5$.

13. A process according to claim 1, wherein said acetalated polyvinyl alcohol contains at least one aliphatic aldehyde with 1 to 10 carbon atoms.

14. A process according to claim 1, wherein said acetalated polyvinyl alcohol additionally contains vinyl acetate groups.

15. A process according to claim 1, wherein said acetalated polyvinyl alcohol is polyvinyl butyral.

16. A process according to claim 1, wherein said acetalated polyvinyl alcohol has a degree of acetylation of 40 to 90% by weight.

* * * * *

UNITED STATES PATENT AND TRADEMARK OFFICE
CERTIFICATE OF CORRECTION

| | | |
|---|---|---|
| PATENT NO. | : 8,178,618 B2 | Page 1 of 1 |
| APPLICATION NO. | : 12/158101 | |
| DATED | : May 15, 2012 | |
| INVENTOR(S) | : Michael Frank et al. | |

It is certified that error appears in the above-identified patent and that said Letters Patent is hereby corrected as shown below:

In the Claims:

Column 10, line 52 (Claim 1), reads: "A process according to claim 5, wherein the process said"
It should read: -- A process according to claim 5, wherein said --.

Signed and Sealed this
Thirty-first Day of July, 2012

David J. Kappos
*Director of the United States Patent and Trademark Office*